US005683785A

United States Patent [19]

Talvalkar et al.

[11] Patent Number: 5,683,785

[45] Date of Patent: Nov. 4, 1997

[54] THERMAL TRANSFER MEDIUM FOR TEXTILE PRINTING APPLICATIONS

[75] Inventors: Shashi G. Talvalkar, Kettering; Marion E. McCreight, West Carrollton, both of Ohio

[73] Assignee: NCR Corporation, Dayton, Ohio

[21] Appl. No.: 551,305

[22] Filed: Nov. 1, 1995

[51] Int. Cl.[6] .......... B32B 3/00

[52] U.S. Cl. .......... 428/195; 428/204; 428/219; 428/323; 428/330; 428/411.1; 428/488.4; 428/500

[58] Field of Search .......... 428/195, 411.1, 428/204, 330, 402, 488.4, 913, 914, 219, 323, 500; 523/200

[56] References Cited

U.S. PATENT DOCUMENTS

| | | | |
|---|---|---|---|
| 3,663,278 | 5/1972 | Blose et al. . | |
| 4,315,643 | 2/1982 | Tokunaga et al. . | |
| 4,403,224 | 9/1983 | Winowski . | |
| 4,463,034 | 7/1984 | Tokunaga et al. . | |
| 4,523,207 | 6/1985 | Lewis et al. . | |
| 4,628,000 | 12/1986 | Talvalkar et al. . | |
| 4,687,701 | 8/1987 | Knirsch et al. . | |
| 4,698,268 | 10/1987 | Ueyama . | |
| 4,707,395 | 11/1987 | Ueyama et al. . | |
| 4,777,079 | 10/1988 | Nagamoto et al. . | |
| 4,778,729 | 10/1988 | Mizobuchi . | |
| 4,869,941 | 9/1989 | Ohki . | |
| 4,923,749 | 5/1990 | Talvalkar . | |
| 4,988,563 | 1/1991 | Wehr . | |
| 5,128,308 | 7/1992 | Talvalkar | 503/201 |
| 5,240,781 | 8/1993 | Obata et al. . | |
| 5,248,652 | 9/1993 | Talvalkar | 503/201 |
| 5,348,348 | 9/1994 | Hanada et al. . | |

OTHER PUBLICATIONS

*A Dictionary of Mining, Mineral and Related Terms*, Ed. Paul W. Thrush, U.S. Dept. of Interior, p. 541, 1968.

*Kirk–Othmer Concise Encyclopedia of Chemical Technology*, vol. 26, 3rd Ed., p. 887.

*Primary Examiner*—William Krynski

[57] ABSTRACT

A thermal transfer ribbon which forms image resistant to offset is provided which comprises a substrate, a first coating which contains a non-hiding pigment and a binder and a second coating which contains a colored pigment and a binder. The binders in each coating are compatible so as to transfer simultaneously to a receiving substrate upon the application of heat while the pigments are sufficiently distinct so as to maintain distinct layers when transferred. In preferred embodiments, coating formulations which are water-rich and allow for the use of minimal organic solvent are used to form the thermal transfer ribbon. Labels having images resistant to offset are also provided which comprise two layers, one a protective layer and one a colored ink layer, each with high loadings of pigment.

12 Claims, 2 Drawing Sheets

THERMAL TRANSFER MEDIUM FOR TEXTILE PRINTING APPLICATIONS

1. Field of the Invention

The present invention relates to thermal transfer printing technology wherein data or images are produced on a receiving substrate by selectively transferring portions of a pigmented layer from a donor film to the receiving substrate.

2. Background of the Invention

Thermal transfer printing is widely used in special applications such as in the printing of machine readable bar codes, either on labels or directly on an article to be encoded. The thermal transfer process employed by these printing methods provides great flexibility in generating images allowing for broad variation in the style, size and color of the printed images, typically from a single machine with a single thermal print head.

Representative documentation in the area of thermal transfer printing include the following patents:

U.S. Pat. No. 3,663,278, issued to J. H. Blose et at. on May 16, 1972, which discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,523,207, issued to M. W. Lewis et al. on Jun. 11, 1985, discloses a multiple copy thermal record sheet which uses crystal violet lactone and a phenolic resin.

U.S. Pat. No. 4,628,000, issued to S. G. Talvalkar et at. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,869,941, issued to Ohki on Sep. 26, 1989, discloses an imaged substrate and a laminated material on the imaged side.

U.S. Pat. No. 4,923,749, issued to Talvalkar on May 8, 1990, discloses a thermal transfer ribbon which has a thermal sensitive layer and a protective layer which is water based.

And, U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

The properties of the transferring material which permit transfer from a carrier to a receiving substrate often limit the applications for thermal transfer printing. For example, it is well known that the integrity of images produced by most thermal transfer printing processes is not high in high temperature/high moisture environments. The use of most conventional thermal transfer inks on garments has not been feasible since the print must withstand the conditions of the garment manufacturing process and the subsequent cleaning, washing and ironing cycles. Not only is the printed information susceptible to loss by offset of the print under these conditions, but the garments can be damaged by the offset print. Therefore, it is very important that the print from the thermal transfer process resist offset under these conditions if it is to be used to provide images directly on fabric.

There are commercially available thermal transfer ribbons (TTR) which provide images that will resist offset under these conditions. These are sold under the trade name Ricoh 110-C thermal transfer ribbon by Ricoh Co., Ltd. and IIMAK Super Hard 36 thermal transfer ribbon. However, these ribbons are produced from polymer dispersions based on organic solvents. Polymers within such dispersions are typically poorly soluble or insoluble in water, providing the resistance to offset needed under the aggressive conditions which garments are exposed to. However, there are strict environmental regulations and restrictions on the use of such solvents in the United States. It is desirable to provide a thermal transfer ribbon which provides print resistance to offset and is not dependent on the use of organic solvent based polymer dispersions for its production.

SUMMARY OF THE INVENTION

It is an object of the present invention to provide a thermal transfer medium such as a thermal transfer ribbon which provides images resistant to offset under aggressive conditions such as high temperature and high moisture.

It is an additional object of the present invention to provide a coating formulation for thermal transfer ribbons which prints images with improved resistance to offset.

It is another object of the present invention to provide labels with an image from a thermal transfer medium which is resistant to offset at 350° F. for 15 seconds at 10 psi.

It is a further object of the present invention to provide coating formulations and thermal transfer ribbons which will provide images with improved offset resistance and can be used in conventional processing equipment and thermal transfer printing apparatus.

Still, another object of the present invention is to provide an image by a thermal transfer process which can be employed on garments without offsetting under manufacturing and processing conditions, with reduced dependence on organic solvents.

Yet, a further object of the present invention is to provide images resistant to offset from a thermal transfer process and transferring material which are based on an aqueous dispersion or a water-rich system.

Additional objects and advantages of the present invention will become apparent and further understood from the detailed description below, together with the annexed drawings.

The above objects are achieved through the thermal transfer medium of the present invention which forms images resistant to offset. Preferred embodiments of the thermal transfer medium will provide printed images resistant to offset at a temperature of 350° F. and pressure of 10 psi for 15 seconds. Such images when deposited on fabric will resist offset under the conditions of the conventional garment manufacturing and handling processes. The thermal transfer medium can be used to generate conventional images such as bar codes, magnetic codes, alpha-numeric characters or designs.

The thermal transfer medium of this invention comprises a flexible substrate, a thermally sensitive first coating positioned on said substrate containing a pigment with low hiding characteristics dispersed in a binder comprised of water soluble, dispersible or emulsifiable resins and a second coating positioned on said first coating containing a colored pigment and a binder comprised of water soluble, dispersible or emulsifiable resins. The binder in the first coating is compatible with the binder in the second coating so as to provide simultaneous transfer of the first and second coatings from the flexible substrate to a receiving substrate upon the application of heat sufficient to soften the first and second coating. The pigment with low hiding characteristics and the colored pigment are sufficiently distinct to maintain the first and second coatings separate (non-integrated) upon transfer.

Another aspect of this invention is a coating formulation which provides thermally sensitive coatings for thermal transfer media. These formulations comprise an aqueous dispersion of calcium carbonate pigment, wax, and thermoplastic resins.

An additional aspect of this invention is a label with a printed image comprising two layers, a colored ink layer and a transparent protective layer positioned on said colored ink layer. The transparent protective layer comprises calcium carbonate pigment in an amount of 25–45 wt % based on the total weight of the dry ingredients within the emulsion which forms the layer, and a binder comprising thermoplastic resin and wax. The colored layer comprises a colored pigment in an amount of 5–15 wt % and calcium carbonate pigment in an amount 10 to 45 wt % based on the total weight of the dry ingredients within the emulsion which forms the colored layer, and a binder comprising thermoplastic resin and wax.

DETAILED DESCRIPTION OF THE PREFERRED EMBODIMENTS

Figure 1:
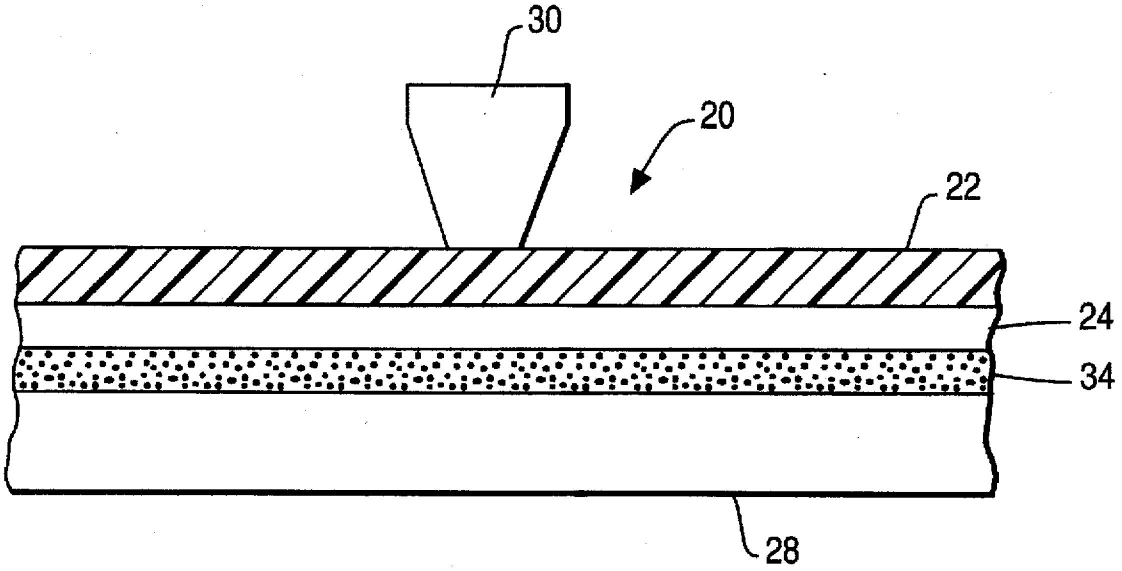
FIG. 1 illustrates a thermal transfer medium of the present invention in operation prior to thermal transfer.
Figure 2:
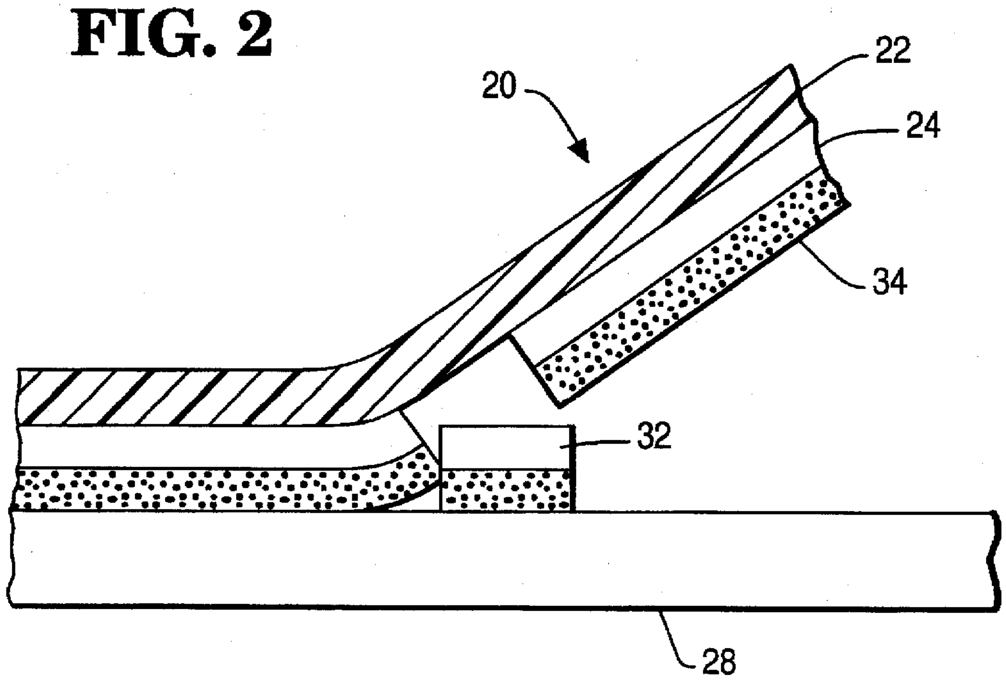
FIG. 2 illustrates a thermal transfer medium of the present invention in operation after thermal transfer.

Thermal transfer ribbon 20, as illustrated in FIGS. 1 and 2, is a preferred embodiment of this invention and comprises a substrate 22 of a flexible material, preferably a thin smooth paper or plastic-like material. Tissue type paper materials and polyester-type plastic materials are preferred. Positioned on substrate 22 is a thermally sensitive first coating 24, also referred to herein as an "undercoating." This undercoating contains a low hiding power pigment and a binder. The thermal sensitivity of the first coating 24 is determined by the softening point of the binder. The transfer ribbon 20 also has a thermally sensitive second coating 34 positioned on the first coating 24 which contains a colored pigment and a binder. The binders within the first coating and second coating are compatible so that exposure to heat from a thermal transfer print head 30 transfers both layers from substrate 22 to a receiving substrate 28. The colored pigment and the low hiding power pigment are sufficiently distinct to maintain the first and second coatings separate upon transfer, i.e., non-integrated, forming dual layer image 32. The binders in the first coating and second coating are preferably identical so as to ensure both coatings respond and transfer to the receiving substrate upon being heated by thermal transfer print head 30. The coatings are then differentiated by the pigments therein. Providing a dual layer image has been found to be advantageous in resisting offset in that the two coatings remain readily separate from each other, allowing each layer of the image formed to perform its function. The first coating creates a top coat which protects the second coating when applied to a receiving substrate. The second coating provides the desired image.

The first coating contains a low hiding power pigment which is preferably colorless so as to provide a transparent layer. This enables a high loading of pigment, preferably above 25 weight percent based on total dry ingredients of the coating formulation and most preferably from 25 to 45 weight percent of total dry ingredients of the coating formulation used to obtain the coating. This high loading of pigment enhances the temperature resistance of the first coating in that the pigment particles have a high melting point. This high loading of pigment also offers enhanced resistance to offset at elevated temperatures and pressures such as those normally encountered in the garment cleaning industry. To maintain low hiding power or transparency for the first coating, particles less than 4 mm in size are preferred. Most preferably, the pigments used are of submicron size. A preferred pigment is calcium carbonate which has a very high melting point and low affinity for transferring itself to fabric under the offsetting temperatures and pressures normally utilized in the garment cleaning industry. Another suitable low hiding power pigment is titanium dioxide. While this pigment may be suitable for many applications, it is not preferred for some in that it does not offer the low hiding power of calcium carbonate. Mixtures of calcium carbonate and titanium dioxide are also suitable.

The second coating is the functioning layer and comprises a colored pigment. Essentially, any colored pigment suitable for use in thermal transfer processes, particularly thermal transfer printing can be employed in the second coating. These include pigments which are sensed by optical, magnetic or electronic means. Suitable examples include SH-1520 (blue) from Heucotech, typically provided as a 50% solid dispersion in water. Also suitable is KS-1720 (black) from Heucotech which is available as a 40% solids dispersion in water. The term "colored pigments" as used herein is intended to include organic dyes such as those described in U.S. Pat. No. 3,663,278 and leuco dyes which react with phenolic resins to generate color either within the same layer or a separate layer. The second coating preferably contains a loading of pigment substantially equivalent to the first coating so as to simplify transfer to the receiving substrate simultaneously with the first coating upon exposure to a thermal print head. In preferred embodiments, the second coating also comprises a portion of the low hiding power pigment within the first coating. This provides a high loading of pigment without excessive use of colored pigment. The use of the same low hiding power pigment may also render the two coatings more compatible for simultaneous transfer. Most preferably, the second coating contains calcium carbonate at a level of about 10 to 45 weight percent based on the total weight of the dry ingredients of the coating formulation used to obtain the coating. It is recognized that the second coating may contain pigments other than colored pigments such as magnetic pigments or fluorescent pigments for specialized applications.

The binders used in the first coating and second coating must be compatible or at least have the same softening characteristics so as to transfer to a receiving substrate simultaneously upon the application of heat sufficient to soften the coatings. Preferably, the binder employed in each coating is the same. The binder has many requirements such as providing thermal sensitivity, flexibility and resiliency for the coatings and providing high adhesion to the receiving substrate when softened, all while retaining a high loading of pigment.

An important component of the binder is thermoplastic resin. Suitable thermoplastic resins for the binder are well known and include those described in U.S. Pat. Nos. 5,240,781 and 5,348,348. In preferred embodiments of the present invention, the binders comprise thermoplastic resins which are soluble in water or can be dispersed or emulsified in aqueous media. Such binders are obtained from coating formulations which are water-rich dispersions, such as the coating formulation of the present invention. To obtain emulsions, such thermoplastic resins are typically used as small particles of submicron size. Preferred binder formulations contain two or more thermoplastic resins to provide specific property profiles for the resulting binder. For example, Piccotex 100 resin by Hercules is a hydrocarbon resin (vinyl toluene-alpha methyl styrene copolymer) that provides high hot tack properties which aids adhesion of the coating to the receiving substrate upon transfer. Polyethylene SL-300, a polyethylene resin of a small (submicron) particle size, is a water soluble surface conditioner within the Slip-Ayd series by Daniel Products Co. which provides slip or wax-like properties for transfer. These thermoplastic resins are preferably used in combination or with another thermoplastic component which provides similar properties.

The binder also contains wax such as hydrocarbon wax, paraffin wax, carnauba wax, etc. to provide thermal sensitivity and aid in the transfer of the coatings to a receiving substrate. Suitable waxes are those used in conventional thermal transfer media and include those described in U.S. Pat. No. 5,240,781. An example of a suitable wax is carnauba wax under the series of Slip-Ayd surface conditioners by Daniel Products Co. Preferred waxes can be dispersed or emulsified in aqueous media.

The binders used in the first and second coatings preferably contain a plasticizer to enhance flexibility and reduce the melting point of the binder. Plasticizers used in binders of conventional thermal transfer ribbons such as those described in U.S. Pat. No. 3,663,278 are suitable for use in the binders described herein. Preferred plasticizers are poly (ethylene oxide) homopolymers such as Polyox N10 Water Soluble Resins by Union Carbide. These plasticizers are water soluble and provide thermal sensitivity and desirable plastic and viscoelastic properties to the coating.

The preferred thermal transfer ribbons contain coatings which comprise 25 to 45 weight percent pigment, 25 to 45 weight percent wax, 15 to 35 weight percent thermoplastic resin (10 to 20 weight percent polyethylene resin and 6 to 15 weight percent Piccotex 100 styrene copolymer) and about 2 to 6 weight percent plasticizer based on the weight of total dry ingredients in the coating formulations. The coatings are typically formed on the substrate by depositing aqueous dispersions or emulsions of these components and drying the formulations.

The thermal transfer media of the present invention can be produced by a two layer process wherein the first coating is applied to substrates such as polyester film as an undercoating and the second coating is applied over the first coating, as an aqueous emulsion. The coating weight of the undercoat is preferably maintained between 3 to 5 gram/sq. meter and the second coating is typically applied at a level at 6 to 10 grams/sq. meter. The coatings are typically applied on an 18 to 24 gage (0.0002 inch thick) polyester film; however, the substrates can vary widely and include those described in U.S. Pat. No. 5,348,348.

The composition of the binder can be adjusted to control the temperature at which the coatings transfer to a receiving subject. The preferred binders soften at a temperature in the range of 50° C. to 300° C. and enable transfer of the first and second coatings at normal print head energies which fall within the range of 50° C. to 250° C., more typically 150° F. to 300° F. and often 180° F. to 275° F. In addition to manipulation of the above components, additives may be introduced to achieve this function or other properties such as improved smear resistance, image quality and scratch resistance.

The coating formulations of this invention contain the above components in an aqueous dispersion or emulsion, typically at about 20 to 45 weight percent solids. To prepare the coating formulations of the present invention, the ingredients are combined as an aqueous emulsion in a ball mill or similar conventional grinding equipment and agitated. Typically, the dispersion consists of about 20 to 45 weight percent solids, preferably 30 weight percent solids. The wax emulsion is typically the initial material added to the grinding or dispersing equipment and the other binder components are added thereto. These coating formulations are applied to substrates by conventional techniques and equipment such as a Meyer Rod or like wire-wound doctor bar set up on a typical coating machine to provide the coating weights described above. The undercoating layer is typically applied at a temperature of 90° to 120° F. The functional layer is then applied to the overcoat layer and dried. The temperature of the driers are typically in the range of 120° to 160° F.

The labels provided by this invention comprise two layers, a colored ink layer and a transparent protective layer, both of which contain high loadings of calcium carbonate pigment as described above, plus colored pigment in the case of the second coating. The colored ink layer and protective layer each contain a binder comprising wax and thermoplastic resin such as a combination of styrene copolymer and polyethylene resin.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLE 1

A coating formulation consistent with the present invention and suitable for a first coating was obtained by preparing the following water-based emulsion.

| First Coating Formulation | | | | |
|---|---|---|---|---|
| Component | Dry % | Dry Batch | Wet Batch | Range Dry |
| Polyox-N10 (@ 20%) | 4.0 | 4.0 | 20.0 | 2–6 |
| Piccotex-100 | 8.0 | 8.0 | 8.0 | 6–15 |
| Calcium Carbonate | 36.5 | 36.5 | 36.5 | 25–45 |
| Carnauba (SL-511)[1] | 36.5 | 36.5 | 114.0 | 25–45 |
| Polyethylene (SL-300)[2] | 15.0 | 15.0 | 50.0 | 10–20 |
| Water | — | — | 501.5 | — |
| N-Propanol | — | — | 70.0 | — |
| TOTAL | 100.0 | 100.0 | 800.0 | |
| FINAL SOLIDS % | 12.5 | | FINAL SOLIDS % | 10–20 |

[1]Carnauba Emulsion (SL-511) by Daniel Products at 32% solids in water
[2]Polyethylene Emulsion (SL-300) by Daniel Products at 30% solids in water A coating formulation consistent with the present invention and suitable for a second coating was obtained by preparing the following water-based emulsion:

| Second Coating Formulation I | | | | |
|---|---|---|---|---|
| Component | Dry % | Dry Batch | Wet Batch | Range Dry |
| KS-1725 (Black)[1] | 5.0 | 5.0 | 12.5 | 5–15 |
| Polyox-N10 (@ 20%) | 4.0 | 4.0 | 20.0 | 1–7 |
| Piccotex 100 | 8.0 | 8.0 | 8.0 | 4–20 |
| Calcium Carbonate | 34.0 | 34.0 | 34.0 | 10–45 |
| Carnauba (SL-511) | 34.0 | 34.0 | 106.2 | 20–60 |
| Polyethylene (SL-300) | 15.0 | 15.0 | 50.0 | 10–20 |
| Water | — | — | 319.3 | — |
| N Propanol (10%) | — | — | 50.0 | — |
| TOTAL | 100.0 | 100.0 | 600.0 | — |
| FINAL SOLIDS % | 16.7 | | FINAL SOLIDS % | 15–30 |

[1]KS-1720 (Black) Dispersion from Heucotech at 40% solids in water.

Example of a Thermal Transfer Medium

A thermal transfer medium consistent with the present invention was prepared as follows: A first coating was formed on a 18–24 gauge polyester film having a weight (width) controlled between 3–5 gms/sq. meter from the First Coating Formulation described above. A second coating having a weight (width) controlled between 6 to 10 grams per square meter was deposited on the first coating with the Second Coating Formulation I described above.

EXAMPLE 2

Another second coating formulation consistent with this invention containing blue pigment (HS-1520 blue) was prepared as described below.

| Second Coating Formulation II | | | | |
|---|---|---|---|---|
| Component | Dry % | Dry Batch | Wet Batch | Range Dry |
| HS-1520 (Blue)[1] | 5.0 | 5.0 | 10.0 | 5–15 |
| Polyox-N10 | 4.0 | 4.0 | 20.0 | 1–7 |
| Piccotex 100 | 8.0 | 8.0 | 8.0 | 4–20 |
| Calcium Carbonate | 34.5 | 34.5 | 34.5 | 10–45 |
| Carnauba (SL-511) | 34.5 | 34.5 | 100.8 | 20–60 |
| Polyethylene (SL-300) | 15.0 | 15.0 | 50.0 | 10–20 |
| Water | — | — | 319.7 | — |
| N-Propanol (10%) | — | — | 50.0 | — |
| TOTAL | 100.0 | 100.0 | 600.0 | — |
| FINAL SOLIDS % | 16.7 | | FINAL SOLIDS | 15–30 |

[1]HS-1520 (Blue) Dispersion from Heucotech at 50% solids in water

Comparative Example of a Thermal Transfer Medium

A single layer thermal transfer medium was prepared from this formulation not consistent with the present invention.

Testing Procedure to Analyze the Image Offsetting Characteristics

To compare the offsetting characteristics of the images obtained from the thermal transfer medium of the present invention and that of the Comparative Example above, the following test procedure was used. First, a bar code was created using a TEC B-30 thermal transfer printer and a Union Camp—8 point tag stock coated on one side (smooth). Energy in the printer was adjusted to provide good quality bar code. (Since only offsetting is analyzed, the coated stock can be used as a receiver. If washing or dry cleaning resistance is to be analyzed, then a fabric, either cotton-polyester or nylon or polyester is used).

Figure 3:
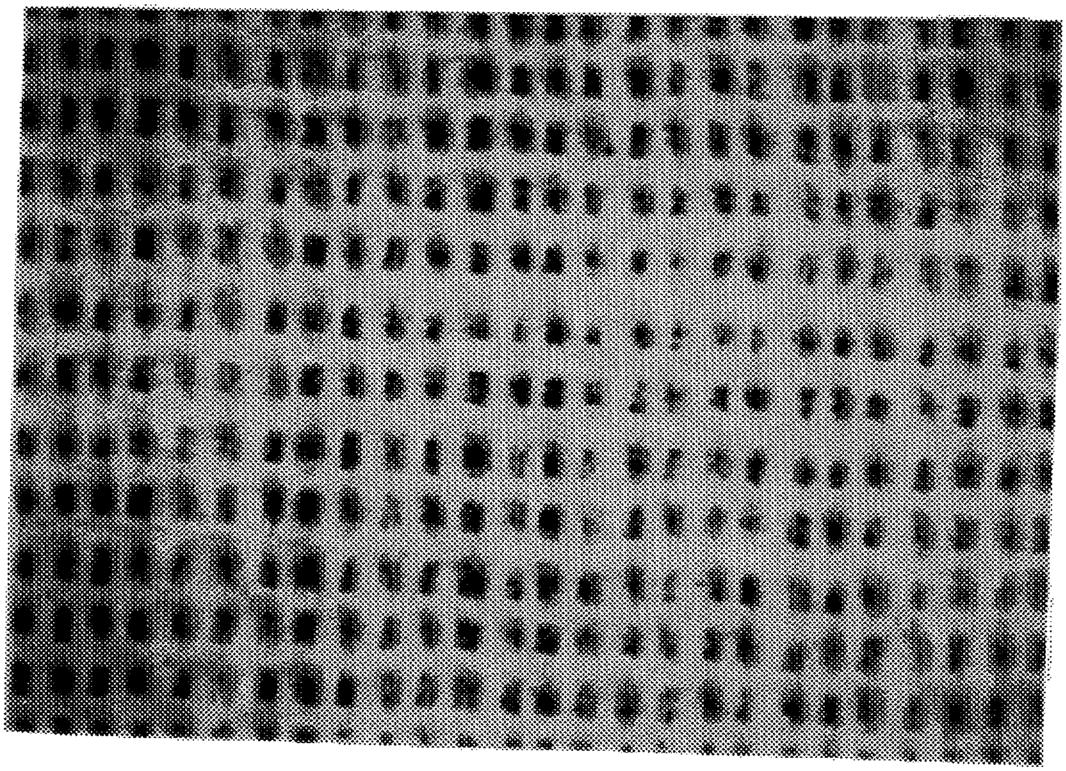
FIG. 3 is a photomicrograph of an image produced by a thermal transfer ribbon of the present invention following exposure to high temperature and moisture.

The offsetting characteristics of the image is analyzed using a "Presto-Sealer". First, the bar code is covered up with a piece of fabric (65% cotton—35% polyester). Next, about eight to ten drops of distilled water are placed on top of the fabric area directly above over the bar code which is then carefully inserted between two plates of the Presto-Sealer unit. Before running the test, the temperature of the upper jaw is maintained at 350° F. for at least half an hour. The jaw pressure is adjusted to 10 psi using the gauge control knob on the unit. The unit is then activated using a foot switch and the test is conducted for a period of 15 seconds. The test piece is then removed from the unit, allowed to cool for approximately half a minute, and the fabric piece is then carefully separated from the bar code. Offsetting characteristics are evaluated by visual observations. The image from the thermal transfer medium of the present invention is shown to have exceptional offsetting resistance and a photomicrograph of the image following the offsetting test appears in FIG. 3 and shows no offsetting. In contrast, the offsetting characteristics of the image obtained from the thermal transfer medium not of this invention shows offset.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer medium which comprises:

a flexible substrate, a thermally sensitive first coating positioned on said substrate containing pigment with low hiding power dispersed in a binder comprised of thermoplastic resin and wax which are soluble, dispersible or emulsifiable in aqueous media, and a thermally sensitive second coating positioned on said first coating containing a colored pigment dispersed in a binder comprised of thermoplastic resin and wax which are soluble, dispersible or emulsifiable in aqueous media, wherein the binder in the first coating is compatible with the binder in the second coating so as to provide for simultaneous transfer of the first and second coatings from the flexible substrate to a receiving substrate upon the application of sufficient heat to the first and second coatings for transfer, and wherein first and second coatings remain non-integrated upon transfer.

2. A thermal transfer medium as in claim 1, wherein the binder in the first coating is identical to the binder in the second coating and said binder provides a coating which softens at a temperature in the range of 50° C. to 300° C.

3. A thermal transfer medium as in claim 1 which transfers images to a receiving substrate when used in a thermal transfer printing apparatus, wherein said images are resistant to offset at 300° F. for 15 seconds at 10 psi.

4. A thermal transfer ribbon which comprises:

a flexible substrate, a thermally sensitive first coating positioned on said substrate comprising a calcium carbonate pigment and a binder comprised of thermoplastic resin and wax which are soluble, dispersible or emulsifiable in aqueous media, and a thermally sensitive second coating positioned on said first coating comprising a colored pigment, calcium carbonate pigment, and a binder comprised of the same thermoplastic resin and wax used in the first coating so as to allow simultaneous transfer of the first and second coatings from the flexible substrate to a receiving substrate upon the application of sufficient heat to the first and second coatings for transfer, and wherein the first and second coatings non-integrated upon transfer.

5. A thermal transfer ribbon as in claim 4, wherein the thermoplastic resin in the binders comprises a combination of polyethylene resin and a styrene copolymer.

6. A thermal transfer ribbon as in claim 5, wherein the binders in the first and second coatings additionally contain a plasticizer.

7. A thermal transfer ribbon as in claim 6, wherein the binder comprises water soluble resins.

8. A thermal transfer ribbon as in claim 4, wherein the calcium carbonate pigment particles are of a size less than 4 mm.

9. A thermal transfer ribbon as in claim 5, wherein the calcium carbonate pigment particles are of a submicron size and the polyethylene resin is derived from in an aqueous emulsion particles of submicron size.

10. A thermal transfer ribbon as in claim 4, wherein the calcium carbonate pigment in the first coating comprises 25–45 weight percent of the dry ingredients in said first coating and the calcium carbonate pigment in the second coating comprises from 10–45 weight percent of the dry ingredients in second coating.

11. A thermal transfer ribbon which comprises:

a flexible substrate, a thermally sensitive first coating positioned on said substrate comprising 25 to 45 weight percent calcium carbonate pigment and a binder which comprises 10 to 20 weight percent polyethylene resin 25 to 45 weight percent wax, 6 to 15 weight percent styrene copolymer and 2 to 6 weight percent plasticizer, which are soluble, dispersible or emulsifiable in aqueous media, said weight percents being based on total dry ingredients of said first coating, and a thermally sensitive second coating positioned on said first coating comprising 10 to 45 weight percent calcium carbonate pigment, 5 to 15 weight percent colored pigment and a binder which comprises 10 to 20 weight percent polyethylene resin, 20 to 60 weight percent wax, 4 to 20 weight percent styrene copolymer, and 1 to 7 weight percent plasticizer, which are soluble, dispersible or emulsifiable in aqueous media, said weight percents being based on the total dry ingredients of the second coating.

12. A method of using a thermal transfer ribbon of claim 1 which comprises forming from said ribbon a label with a printed image comprising two layers, which comprise a colored ink layer positioned on a receiving substrate and a transparent protective layer positioned on said colored ink layer, said transparent layer comprising calcium carbonate pigment in an amount of 25 to 45 weight percent, based on the total weight of the dry ingredients of a coating formulation which provides the transparent protective layer, and a binder comprising thermoplastic resin and wax, said colored ink layer comprising 5 to 15 weight percent colored pigment and 10 to 45 weight percent calcium carbonate pigment, based on the total weight of dry ingredients of a coating formulation which provides the colored layer, and a binder comprising thermoplastic resin and wax.

* * * * *

UNITED STATES PATENT AND TRADEMARK OFFICE

CERTIFICATE OF CORRECTION

PATENT NO. : 5,683,785

DATED : Nov. 4, 1997

INVENTOR(S) : Shashi G. Talvalkar et al.

It is certified that error appears in the above-indentified patent and that said Letters Patent is hereby corrected as shown below:

Column 9, lines 42 and 43, after "from" delete "in an aqueous emulsion particles of submicron size" and insert --particles of submicron size in an aqueous emulsion--.

Column 10, line 4, after "in" insert --said--.

Signed and Sealed this

Twenty-seventh Day of October, 1998

Attest:

BRUCE LEHMAN

*Attesting Officer* *Commissioner of Patents and Trademarks*